Jan. 21, 1947.  E. R. DOBIE  2,414,638
REVERSING VALVE
Filed Nov. 8, 1944  3 Sheets-Sheet 1
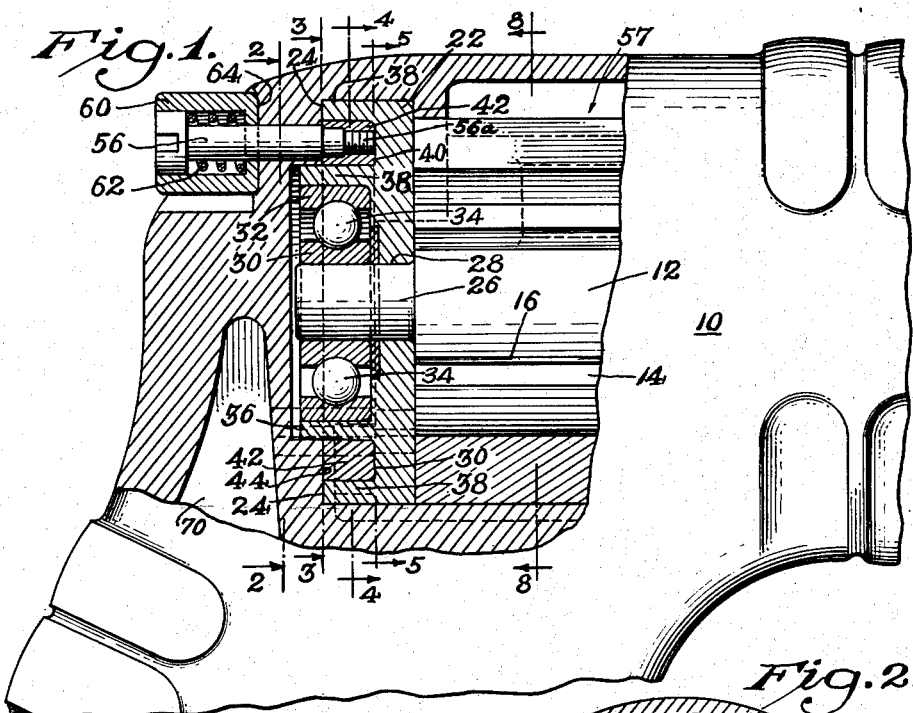
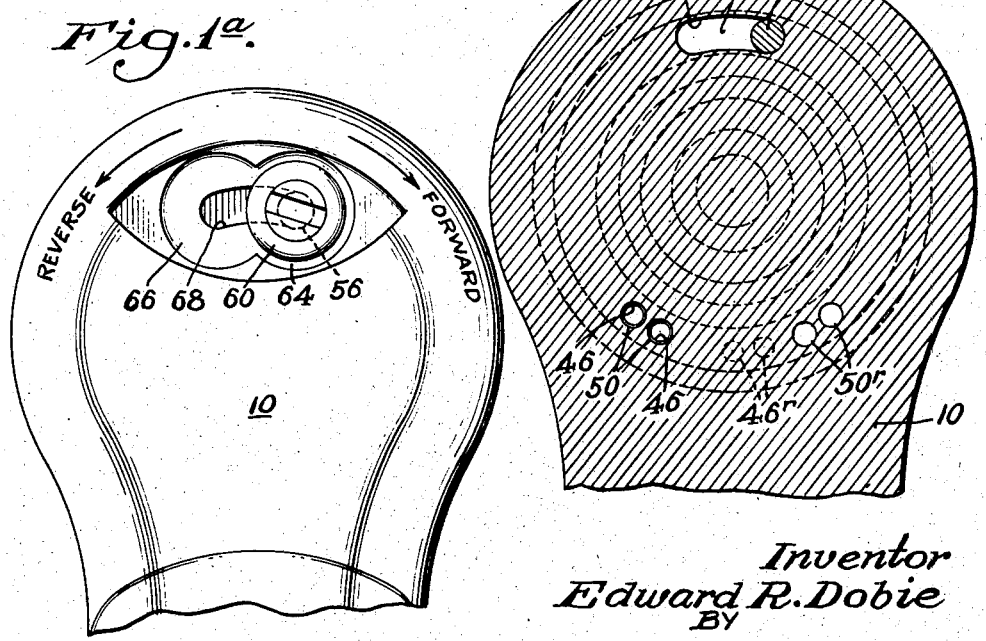
Inventor
Edward R. Dobie
BY
Bair & Freeman
Attorneys.

Inventor
Edward R. Dobie
BY
Bair & Freeman
Attorneys.

Jan. 21, 1947.   E. R. DOBIE   2,414,638
REVERSING VALVE
Filed Nov. 8, 1944   3 Sheets-Sheet 3
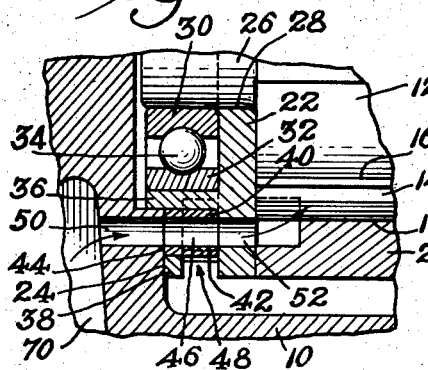
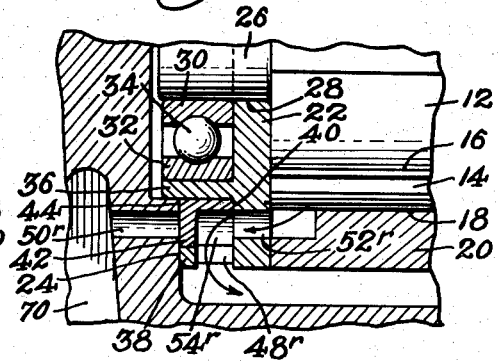
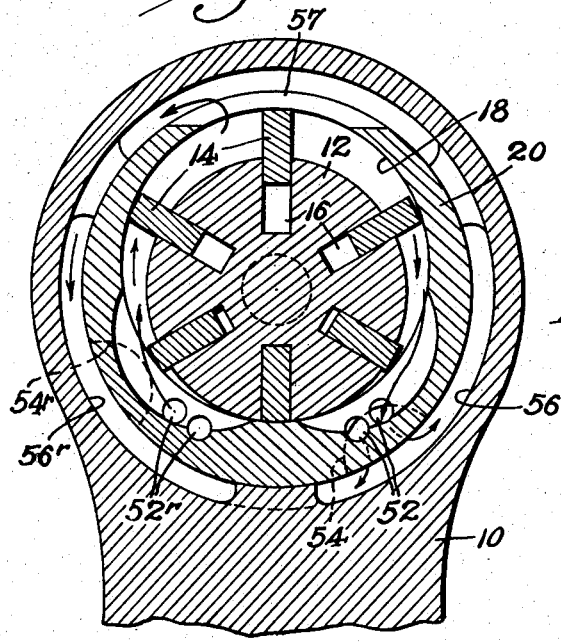
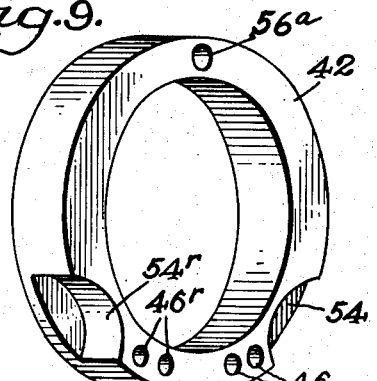
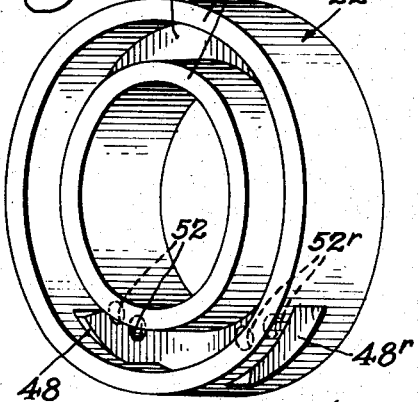
Inventor
Edward R. Dobie
BY
Bair & Freeman
Attorneys.

Patented Jan. 21, 1947

2,414,638

UNITED STATES PATENT OFFICE 2,414,638

REVERSING VALVE

Edward R. Doble, Bryan, Ohio, assignor to The Aro Equipment Corporation, Bryan, Ohio, a corporation of Ohio Application November 8, 1944, Serial No. 562,523

8 Claims. (Cl. 121—34)

My present invention relates to a reversing valve for pneumatic motors and the like and is particularly designed for compact fabrication in a relatively small size tool of the pneumatic grinder or drill type.

One object of the invention is to provide a reversing valve which can be built into an end plate of a motor and includes a reversing plate of annular or washer-like character seated in the end plate, the reversing plate being oscillatable to two different positions, one in which it drives the motor forwardly and the other in which it drives it in a reversed direction.

Another object is to provide an arrangement in which the reversing plate can be made of very simple design having a pair of through-ports and a pair of notches so coacting with ports of the end plate and in the housing in which it is mounted that the desired control of air is effected by oscillating the reversing plate through a short angle of movement.

Still a further object is to provide a reversing plate which may be in the form of a ring fitting around a bearing for the rotor of the motor so as to occupy but small space and to so coact with the bearing as to eliminate the necessity of providing considerable space in which to mount the valve.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is a side elevation of a pneumatic grinder or the like to which my reversing valve can be applied and in connection with which it is shown on the drawings.

Fig. 1a is a fragmentary rear elevation of the upper left hand corner of Fig. 1 showing a reversing knob control.

Figs. 2, 3, 4 and 5 are enlarged vertical sectional views of the tool on the respective lines indicated in Fig. 1.

Figure 3:
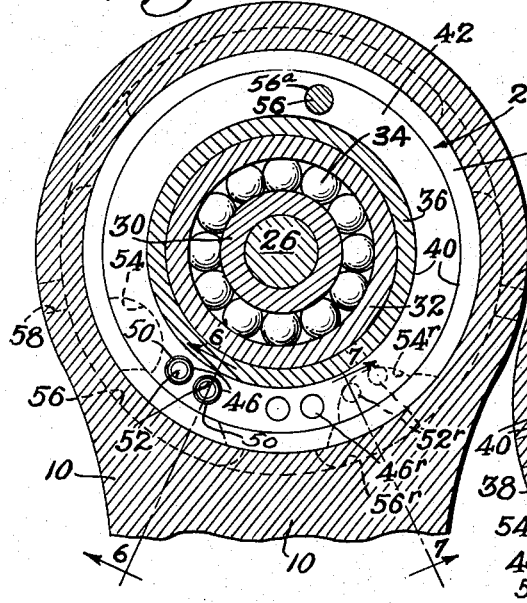

Figs. 6 and 7 are sectional views on the lines 6—6 and 7—7 of Fig. 3.

Fig. 8 is an enlarged sectional view on the line 8—8 of Fig. 1.

Fig. 9 is a perspective view of an end plate used in my reversing valve, and

Fig. 10 is a perspective view of the reversing plate used therein.

On the accompanying drawings, I have used the reference numeral 10 to indicate in general a housing of the pneumatic motor in which my reversing valve is mounted. The rotor of the motor is shown at 12 and is of the sliding vane type wherein the vanes are shown at 14. They slide in and out of slots 16 in the rotor 12 and conform, due to centrifugal force, to an eccentric bore 18 of a stator sleeve 20 in the housing 10.

A rear end plate 22 is located within the housing 10 against a shoulder 24 thereof. The stator sleeve 20 holds it in position and, in turn, may be held by the front end of the housing 10 which is made detachable but is not illustrated in detail as this forms no part of my present invention.

The rotor 12 has a stud 26 extending through an opening 28 of the end plate 22 and into a ballbearing, the inner race of which is shown at 30, the outer race at 32 and the balls at 34. The outer race 32 is located in a cylindrical flange 36 of the end plate 22 and at the periphery of the end plate is a second cylindrical flange 38. Between these two flanges, an annular groove or seat 40 is provided.

The seat 40 is for a reversing plate 42 to seat in. This plate is washer-like in character and snugly fits its seat with only enough tolerance to permit oscillation of the valve plate without binding. Its forward and rearward surfaces are flat and seal against the bottom of the seat 40 and a face 44 of the housing 10 so that ports in these various faces may be aligned with each other for pressure fluid passage, and when not aligned, they cut off the pressure fluid flow.

The porting arrangement will now be described. It includes a forward port 46 and a reverse port 46r in the reversing plate 42. Actually there are two of the ports 46 and two of the ports 46r merely for obtaining the desired capacity, but for the purpose of my claims they will be considered as single ports. The flange 38 of the end plate 22 has secondary ports 48 and 48r. The housing 10 has ports 50 and 50r while the end plate 22 has through-ports 52 and 52r. Other ports are provided in the reversing plate 42 in the form of notches 54 and 54r and finally the housing 10 has exhaust coring passageways 56 and 56r communicating with atmosphere through exhaust openings 58 and 58r in the housing. The stator sleeve 20 also has a port 57 through which air is discharged regardless of the direction of rotation of the motor.

Figure 4:
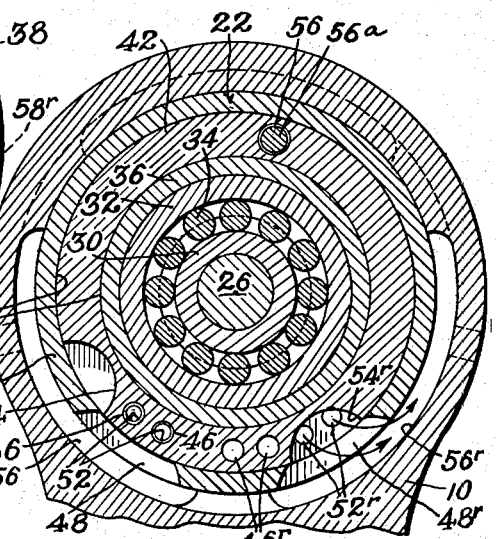
Figure 5:
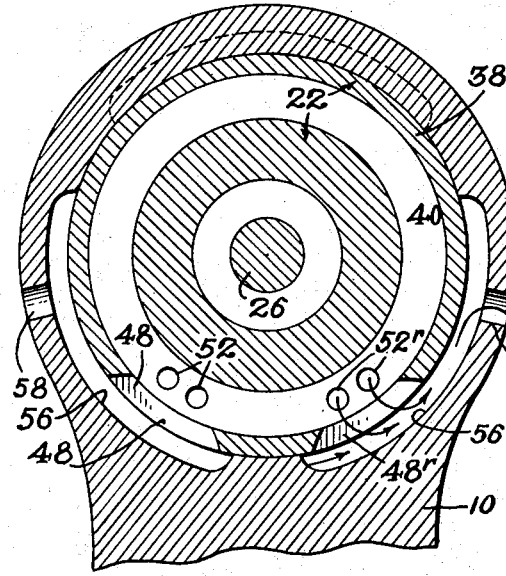
Figure 4A:
Fig. 4a is a fragmentary sectional view similar to Fig. 4 showing the reversing valve adjusted to the "reverse" position instead of the "forward" position shown in Fig. 4.

For controlling the reversing plate 42 as by oscillating it from the position of Fig. 4 to the position of Fig. 4a or vice versa, I provide a control pin 56 threaded into the reversing plate at 56a. A knob 60 is slidable thereon under the bias of a spring 62 to seat in either a "forward" seat 64 or a "reverse" seat 66. The pin 56 extends through an arcuate slot 68 of the housing 10 to permit of such movement from one position to the other and to limit the movement.

Practical operation

In the operation of my reversing valve, assuming the parts to be shown as in the position of Figs. 1 to 7, it will be noted that the through-port 52 of the end plate permits pressure fluid from a cavity 70 within the housing 10 to pass successively through the ports 50, 46 and 52. The pressure fluid accordingly impinges the blades 14 of the rotor 12 to cause rotation of the rotor in a forward direction. Exhaust from the motor passes successively through the ports 52r, 54r and 48r entering the passageways 56r and being discharged through the exhaust openings 58r to atmosphere.

When it is desirable to reverse the rotation of the motor, the knob 60 is pulled outwardly and the pin 56 may then be swung over to the "reverse" position whereupon the knob may be released and will seat in the seat 56. The port arrangement is now as illustrated in Fig. 4a and air intake is through 50r, 52r and 46r whereas air exhaust is through 46, 54, 48 and 56. Thus by a simple porting arrangement, pressure fluid may be introduced straight through the reversing plate and exhaust air may be deflected in the notches 54 to pass out to atmosphere without any interference of the inlet ports with the outlet ports. At the same time the dual porting arrangement 52 and 52r and 54 and 54r on the reversing plate cooperates with similar dual porting arrangements in the end plate and the housing to accomplish these results with half the ports operating in one position and the other half in the other position and with appropriate cut-off effected for the various ports in the two positions of the reversing valve. At the same time the reversing plate is in the form of a simple washer-like ring that may be accurately seated to effect the pressure fluid control in a very efficient manner.

For purpose of illustrations, the ports 46, 50 and 52 and their companion ports 46r, 52r and 50r have been shown progressive in size in Figs. 2, 4 and 4a whereas they are actually the same size as shown in the other figures. The purpose of this is merely to show which ports are in alignment in these three figures.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a reversing valve for a pneumatic motor or the like including a rotor and a rotor end plate, said rotor end plate having a pair of ports, one for intake and the other for exhaust when the rotor rotates in one direction, and said one for exhaust and said other for intake when the rotor rotates in the opposite direction, said end plate having an annular seat, a ring-like reversing plate seated therein and having two ports therethrough and two notches therein, said end plate having a pair of exhaust openings to cooperate alternately with said notches, a housing for said rotor having a pressure fluid cavity, and ports therefrom to communicate alternately with said ports of said reversing plate, one of said end plate ports, one of said notches and one of said exhaust openings communicating with each other while the other end plate port, one of said reversing plate ports and one of said pressure fluid openings communicate with each other and vice versa.

2. In a reversing valve for a pneumatic motor or the like including a rotor and a rotor end plate, said rotor end plate having a pair of ports, one for intake and the other for exhaust when the rotor rotates in one direction, and said one for exhaust and said other for intake when the rotor rotates in the opposite direction, a ring-like reversing plate between said end plate and a housing for said rotor having two ports therethrough and two notches therein, said end plate having a pair of exhaust openings to cooperate alternately with said notches, said housing having a pressure fluid cavity, and ports therefrom to communicate alternately with said ports of said reversing plate, one of said end plate ports, one of said notches and one of said exhaust openings communicating with each other while the other end plate port, one of said reversing plate ports and one of said pressure fluid openings communicate with each other and vice versa.

3. In a reversing valve including a rotor and a rotor end plate, said rotor end plate having a pair of ports, one for intake and the other for exhaust when a rotor adjacent said end plate rotates in one direction, and said one port for exhaust and said other port for intake when the rotor rotates in the opposite direction, a bearing in said end plate for said rotor, an annular control plate surrounding said bearing and having two through-ports and two deflecting ports therein, said end plate having a pair of exhaust openings to cooperate alternately with said deflecting ports, a housing for said rotor having a pressure fluid cavity and ports therefrom to communicate alternately with said through-ports of said control plate, one of said end plate ports, one of said deflecting ports and one of said exhaust openings communicating with each other while the other end plate port, the other through-port and one of said pressure fluid openings communicate with each other.

4. In a reversing valve for a pneumatic motor or the like including a rotor and a rotor end plate, said rotor end plate having a pair of ports, one for intake and the other for exhaust when the rotor rotates in one direction, said end plate having an annular seat, a ring-like reversing plate having two through-ports and two notches therein, said end plate having a pair of exhaust openings to cooperate alternately with said notches, a housing for said rotor having a pressure fluid cavity, and ports therefrom to communicate alternately with said through-ports, an end plate port, a notch and an exhaust opening communicating with each other while the other end plate port, the other through-port and a pressure fluid opening communicating with each other when said reversing plate is adjusted in one direction, and said other end plate port, the other notch and the other exhaust opening communicating with each other while said first end plate port, said first through-port and the other pressure fluid opening communicating with each other when said reversing plate is adjusted in an opposite direction.

5. In a reversing valve for a pneumatic motor or the like, including a rotor and a rotor end plate, said rotor end plate having a pair of ports, one for intake and the other for exhaust when the rotor rotates in one direction, and said one for exhaust and the other for intake when the rotor rotates in the opposite direction, a housing for the end plate and rotor, a reversing element between said end plate and said housing, said end plate having radial ports and said housing having ports, said reversing element having through-ports for effecting communication between one of the end plate ports and the housing ports, said reversing element also having deflecting ports for effecting communication between housing ports and the other of said end plate ports, said through ports and deflecting ports communicating, one with the housing and one of said end plate ports and the other with the other end plate port and said deflection ports in one position of the reversing element and vice versa.

6. In a structure of the character disclosed including a motor, a housing for said motor, said motor including a rotor and a rotor end plate, said rotor end plate having a pair of ports, one for intake and the other for exhaust to said motor or vice versa, depending upon the direction of rotation of the motor, a reversing plate between said end plate and said housing, said housing having openings from a pressure fluid cavity within the housing, said end plate having openings to atmosphere and said reversing plate having two pairs of ports, one pair for communicating with one of said ports of said end plate and with one of said housing ports and the other for communicating with the other of said end plate port and the other of said housing ports in opposite positions of said reversing plate.

7. In a reversing valve for a pneumatic motor or the like including a rotor and a rotor end plate, said rotor end plate having a pair of ports, one for intake and the other for exhaust when the rotor rotates in one direction, and said one for exhaust and said other for intake when the rotor rotates in the opposite direction, a housing for said rotor and end plate, a reversing plate between said end plate and housing, said end plate having through-ports and radial ports and said housing having ports, the housing ports and through-ports communicating fluid under pressure to said motor and the through-ports, and radial ports communicating with atmosphere, and a reversing plate between said end plate and said housing having through-ports for communicating said first through-ports with the housing ports and having deflecting ports for communicating them with said radial ports.

8. In a structure of the character disclosed, a housing including a rotor and a rotor end plate, said rotor end plate therein having a pair of through-ports, one for intake and the other for exhaust to a motor or vice versa, depending upon the direction of rotation of the motor, a reversing plate between said end plate and said housing, said housing having openings from a pressure fluid cavity within the housing, said end plate having openings to atmosphere and said reversing plate having two pairs of ports, one pair for communicating said through-ports of said end plate in one order with said housing ports and with said openings to atmosphere in one position of the reversing plate and for communicating said through-ports in reverse order with said housing ports and with said openings to atmosphere.

EDWARD R. DOBIE.